United States Patent [19]

Oetiker

[11] E Patent Number: Re. 33,639

[45] Reissued Date of Patent: Jul. 16, 1991

[54] MECHANICAL LOCK FOR CLAMPS

[75] Inventor: Hans Oetiker, Horgen, Switzerland

[73] Assignee: Hans Oetiker AG Maschinen- und Apparatefabrik, Horgen, Switzerland

[21] Appl. No.: 417,047

[22] Filed: Oct. 4, 1989

Related U.S. Patent Documents

Reissue of:

[64] Patent No.: 4,315,348
Issued: Feb. 16, 1982
Appl. No.: 36,979
Filed: May 8, 1979

[51] Int. Cl.[5] ..... B65D 63/02

[52] U.S. Cl. ..... 24/20 CW; 24/20 R; 24/20 W

[58] Field of Search ..... 24/20 CW, 20 R, 20 EE, 24/19, 23 EE, 20 W, 20 TT, 20 LS, 20 S, 279; 248/74 R

[56] References Cited

U.S. PATENT DOCUMENTS

| | | | |
|---|---|---|---|
| Re. 22,601 | 2/1945 | Sprouse . | |
| 792,376 | 6/1905 | Yamamoto | 24/20 R |
| 1,221,425 | 4/1917 | Dremel . | |
| 1,270,927 | 7/1918 | Clancy | 24/279 |
| 1,272,541 | 7/1918 | Scott . | |
| 1,291,471 | 1/1919 | Funk . | |
| 1,369,851 | 3/1921 | Swaidmark . | |
| 1,467,708 | 9/1923 | Cooper . | |
| 1,487,903 | 3/1924 | Vitek . | |
| 1,517,184 | 11/1924 | Barto et al. . | |
| 1,559,049 | 10/1925 | Rutledge . | |
| 1,641,559 | 9/1927 | Thompson . | |
| 2,335,464 | 11/1943 | Tinnerman . | |
| 2,374,541 | 4/1945 | Hartman . | |
| 2,405,912 | 8/1946 | Tinnerman . | |
| 2,657,890 | 11/1953 | Atkins | 248/74 R |
| 2,847,742 | 8/1958 | Oetiker . | |
| 2,852,832 | 9/1958 | Jones . | |
| 3,106,757 | 10/1963 | Thurston et al. | 24/20 CW |
| 3,124,376 | 3/1964 | Stovall . | |
| 3,154,330 | 10/1964 | Clark et al. | 24/20 TT |
| 3,159,708 | 12/1964 | Deal | 24/20 LS |
| 3,286,314 | 11/1966 | Oetiker | 24/20 CW |
| 3,303,669 | 2/1967 | Oetiker | 24/20 R |
| 3,321,811 | 5/1967 | Thomas . | |
| 3,402,436 | 9/1968 | Oetiker . | |
| 3,475,793 | 11/1969 | Oetiker . | |
| 3,510,918 | 5/1970 | Oetiker . | |
| 3,523,337 | 8/1970 | Oetiker . | |
| 3,750,241 | 8/1973 | Bootha . | |
| 3,789,463 | 2/1974 | Oetiker . | |
| 3,869,944 | 3/1975 | Detiker | 24/20 CW |
| 3,981,049 | 9/1976 | Oetiker . | |
| 4,106,799 | 8/1978 | Oetiker . | |
| 4,237,584 | 12/1980 | Oetiker . | |
| 4,312,101 | 1/1982 | Oetiker . | |
| 4,365,393 | 12/1982 | Hauffe et al. . | |

FOREIGN PATENT DOCUMENTS

| | | | |
|---|---|---|---|
| 783296 | 4/1968 | Canada | 24/20 CW |
| 199010 | 1/1907 | Fed. Rep. of Germany . | |
| 1575159 | 8/1970 | Fed. Rep. of Germany | 24/20 CW |
| 2359284 | 6/1974 | Fed. Rep. of Germany . | |
| 2511575 | 9/1978 | Fed. Rep. of Germany . | |
| 454463 | 7/1913 | France . | |
| 2120804 | 8/1972 | France . | |
| 2297376 | 8/1976 | France . | |
| 2456896 | 12/1980 | France . | |
| 2470276 | 5/1981 | France . | |
| 47-43054 | 12/1972 | Japan . | |
| 50-4889 | 1/1975 | Japan . | |
| 54-36126 | 3/1979 | Japan . | |
| 82450 | 8/1956 | Netherlands | 24/20 CW |
| 230771 | 4/1944 | Switzerland . | |
| 4533 | of 1892 | United Kingdom . | |
| 261549 | 11/1926 | United Kingdom . | |
| 576697 | 4/1946 | United Kingdom | 24/279 |
| 1369956 | 10/1974 | United Kingdom . | |
| 1393555 | 5/1975 | United Kingdom . | |

*Primary Examiner*—Victor N. Sakran

*Attorney, Agent, or Firm*—Paul M. Craig, Jr.

[57] ABSTRACT

A clamp structure with a clamping band and with at least one plastically deformable so-called "Oetiker" ear to be contracted to tighten the clamp structure about the object to be fastened; to assure a substantially smooth; gap-free transistion in the circumferential direction within the area of overlap, for example, of an inner and outer band portion in the area of mechanical interlock or of an insert member and corresponding parts of the clamping band, a tongue portion is provided at each free end of the inner part which is adapted to engage in a corresponding aperture in the respective outer part when the ear is contracted.

35 Claims, 2 Drawing Sheets

FIG. 1 PRIOR ART
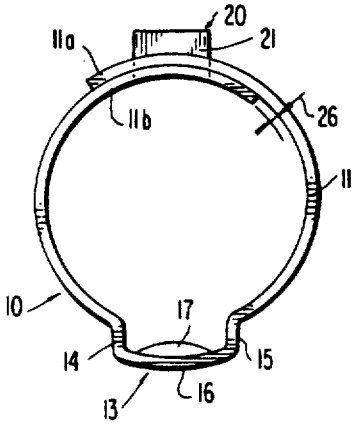
FIG. 2 PRIOR ART
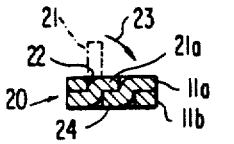
FIG. 3 PRIOR ART
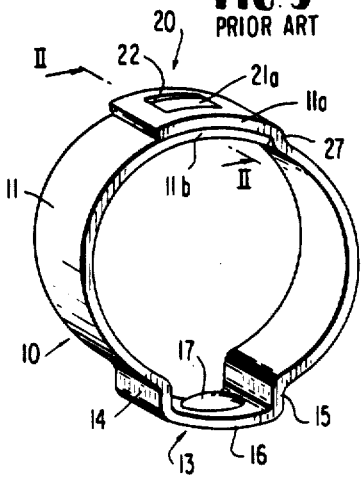
FIG. 4a
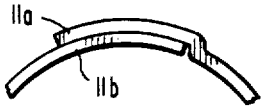
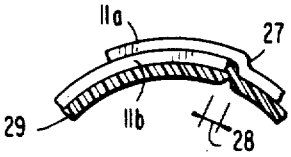
FIG. 4b
FIG. 5
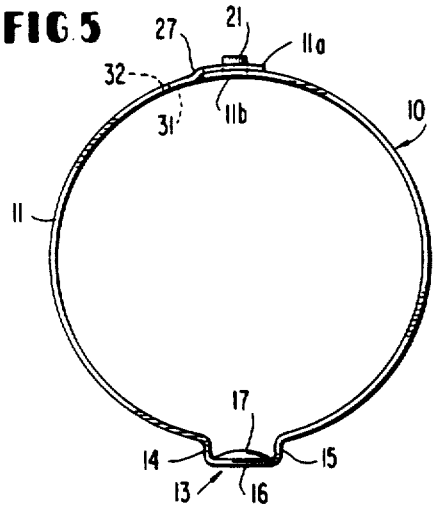
FIG. 6
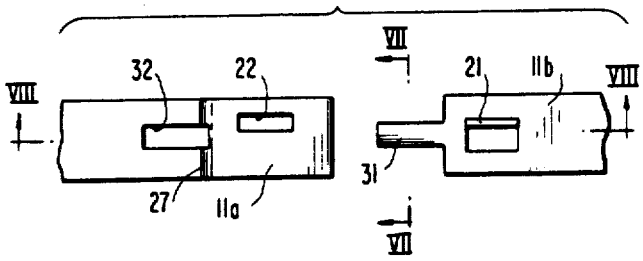
FIG. 7b
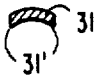
FIG. 7c
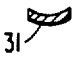
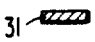
FIG. 7a
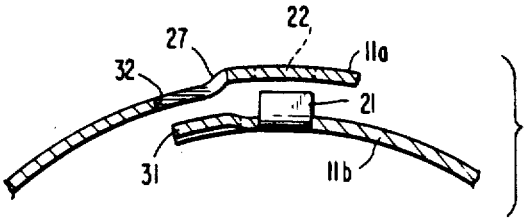
FIG. 8
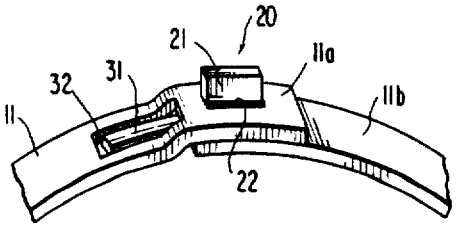
FIG. 9

FIG. 10
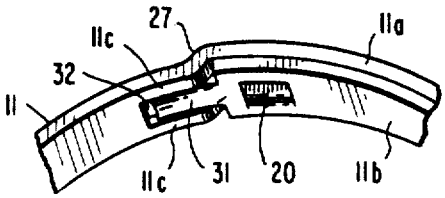
FIG. 11
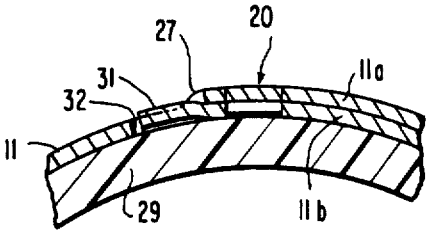
FIG. 12
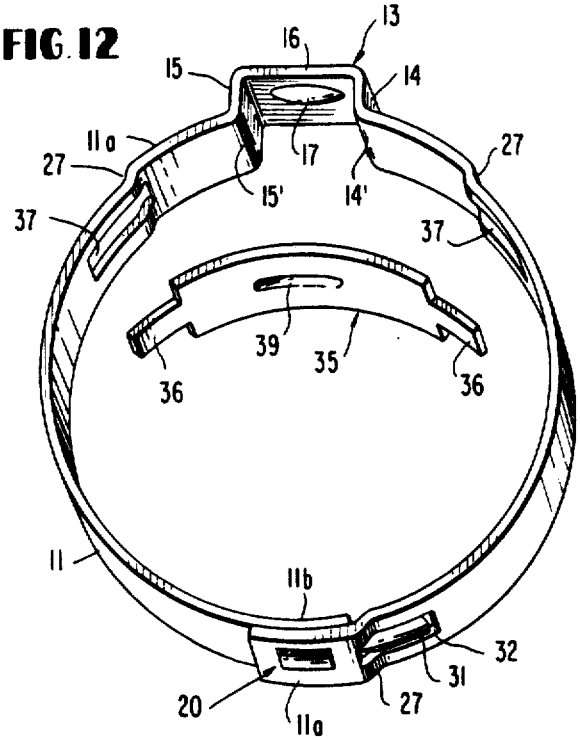
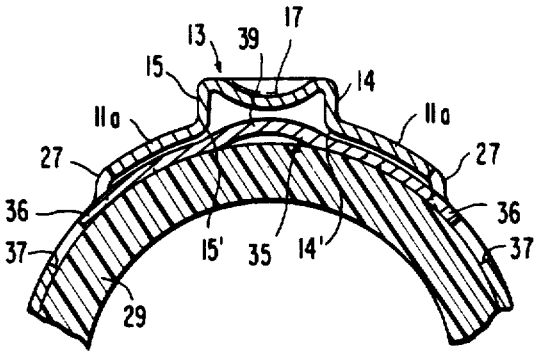
FIG. 13
FIG. 14
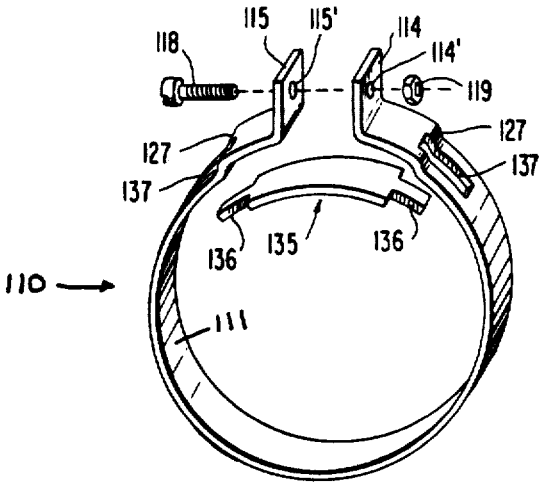

MECHANICAL LOCK FOR CLAMPS

Matter enclosed in heavy brackets [ ] appears in the original patent but forms no part of this reissue specification; matter printed in italics indicates the additions made by reissue.

The present invention relates to a clamp structure with an area of overlap, and more particularly to a hose clamp made of band material whose overlapping free ends are connected together and/or to a hose clamp with an insert member.

My prior U.S. Pat. No. 3,286,314 discloses a clamp structure in which the overlapping free ends of the band are mechanically interconnected by a rivet-like structure. The clamp structure as disclosed in this prior U.S. patent was manufactured and sold by my companies in very large quantities, involving hundreds of millions of clamps, and has proved extremely successful in numerous applications. Moreover, to avoid possible leakage problems due to the occurrence of a step within the area of overlap, which resulted from the overlap of the free band ends and which could correspond to about the thickness of the band material, my prior U.S. Pat. No. 3,286,314 also discloses in FIG. 4 a small step-like shoulder or offset in the outer band part displacing the outer overlapping band portion in the generally radial direction by approximately the thickness of the band material so that the overlapping inner band portion forms with the outer band part a continuation of the ring-like configuration of the clamp structure.

Through the clamp-structure as disclosed in my prior U.S. Pat. No. 3,286,314 proved completely satisfactory with the then-existing hose materials in practically all applications over many years, the trend toward plastic hoses having a relatively higher degree of hardness of, for instance, 90 Shore and more in place of the previously used, more elastic rubber-like hose materials, renders increasingly important the necessity of an internal gapless surface to be offered by the clamp structure to the plastic hose material in order to avoid with certainty any leakage. This is so as even relatively minor gaps or discontinuities in the circumferential direction on the part of the inner surface of the clamp structure may cause a leakage problem with the use of these relatively hard plastic hose materials which have recently appeared on the market for use, for example, with axle boots and gasoline lines in the automotive industry.

Consequently, the present invention is concerned with the task to eliminate in a simple and reliable manner the shortcomings and drawbacks encountered with the prior art clamp structures and to provide a novel clamp structure of the type described above which assures a substantially gap-free, stepless transition in the circumferential direction within the area of overlap of inner and outer parts.

The underlying problems are solved according to the present invention in that a tongue portion is provided at the free end of the inner band part which is adapted to engage into an aperture provided in a corresponding location of the outer band part. As a result thereof, a substantially gap-free and step-free transition in the circumferential direction is assured, even though one band portion overlaps the other band portion.

A particularly effective arrangement of the present invention is realized if the aperture is provided within the area of an outwardly extending step-like shoulder or offset provided in the outer band part whereby the step is of such configuration that the outer band part is displaced relative to the ring-like configuration of the clamp structure by a radial distance approximately equal to the thickness of the band material.

The present invention assures a completely satisfactory gap-free transition within the area of overlap of the free ends of the band, mechanically interlocked by a rivet-like structure as disclosed in my prior U.S. Pat. No. 3,286.314, according to which a circumferentially extending tab bent-out of the inner band portion extends through a circumferential slot in the outer band portion and is bent back toward the band material to thereby displace inwardly the band material of the outer band portion disposed therebelow.

The arrangement according to the present invention assures reliably a completely satisfactory leakage-free transition at the point of overlap of mechanically interconnected band ends of the clamp structure when its so-called "Oetiker" ear consisting of two generally outwardly extending leg portions interconnected by a generally circumferentially extending bridging portion is contracted to tighten the clamp structure about the object to be fastened. Any minimal relative movement in the circumferential direction of the overlapping band portions that might create only a minimal gap is rendered ineffectual and harmless by the tongue portion of the present invention. The ear itself may be provided with a reinforcing circumferentially extending groove in the bridging portion as disclosed in my prior U.S. Pat. Nos. 3,402,436 and 3,475,793.

Another possible problem area for leakage places is the small gap in the circumferential direction which may remain underneath the typical "Oetiker" ear when the latter is completely contracted. Hose material lying under the ear may be displaced into any remaining small gap, thereby again causing a possible leakage, especially with the harder types of present-day plastic hose materials. To eliminate this drawback an insert member has already been proposed in my prior U.S. Pat. Nos. 3,303,669 and 3,789,463 to eliminate any discontinuities in the circumferential direction due underneath the ear which resulted from this small gap. To minimize thereby any steps or discontinuities in the circumferential direction which, in turn, might be caused by the insert member, the latter was made of relatively thin band material which then necessitated some reinforcing means to prevent buckling of the thin band material into the gap underneath the ear which the insert member was intended to bridge. The insert members are disclosed in my prior U.S. Pat. Nos. 3,303,669 and 3,789,463 again proved very successful in most applications with the use of the relatively elastic hose materials as previously used. However, with the availability of the relatively much harder plastic hose materials, even the minute step created by a very thin band material can no longer be ignored insofar as possible leakage problems are concerned.

Consequently, the present invention also aims at eliminating these shortcomings and drawbacks by assuring a substantially gap-free transition in the circumferential direction from the free ends of the insert member to the ring-like configuration formed by the adjoining band parts of the clamp structure. The underlying problems are solved by the provision of a tongue portion at each free end of the insert member, adapted to engage during contraction of the so-called "Oetiker" ear in an aperture located within a corresponding area of the overlying band portion of the clamp structure. Each aperture in the corresponding band portion is preferably located at least within the area of an outwardly extending step-like shoulder or offset in the respective band portion, whereby the step is of such configuration that the band portion is displaced, within the area of the overlap with the insert member, by a radial distance approximately equal to the thickness of the material from which the insert member is made.

The tongue portion, as used within the area of the mechanical interlock of a clamp structure according to the present invention and/or within the area of the free ends of the insert member according to the present invention, may be flat as viewed in transverse cross section. However, each tongue portion may also be arcuate in transverse cross section, e.g., may be concavely curved or is preferably convexly curved in transverse cross section so that the areas of engagement of a respective tongue portion with the object to be fastened, will be concentrated in the outer end areas of the arched configuration which may be more or less point-like in configuration, whence higher specific fastening forces are produced in the radial direction. The present invention thus eliminates with certainty any leakage problems that may be caused by even the slightest gaps or discontinuities in the circumferential direction due to the existence of overlapping parts in a clamp structure intended for use with hose materials that have a relatively high degree of hardness or with relatively thin-walled hard or soft hose materials having a thickness of the order of one or a few millimeters or even less, which entail the same problems as the relatively thicker hard plastic hose materials mentioned hereinabove. Moreover, the present invention can be readily manufactured by mass-production techniques involving no significant increase in manufacturing costs over existing clamp structures and no significant increase in band material that might increase the price thereof.

Accordingly, it is an object of the present invention to provide a clamp structure of the type described above which avoids by simple means the aforementioned shortcomings and drawbacks encountered in the prior art.

Another object of the present invention resides in a clamp structure which effectively eliminates any leakage problems due to gaps or discontinuities in the circumferential direction in the inner surface of the clamp structure.

A further object of the present invention resides in a hose clamp whose ends are mechanically interconnected within the area of overlap of the free band ends, which effectively eliminates any gaps or discontinuities resulting from the overlap.

Still a further object of the present invention resides in a clamp structure with an insert member at least within the area of the opening underneath a so-called "Oetiker" ear, in which a gap-free transition is assured over the entire circumference of the inner surface of the clamp structure including the areas of overlap of the free ends of the insert member with the band portions.

Another object of the present invention resides in a clamp structure which permits the use of an insert member of relatively thicker material without danger of leakages that otherwise occur due to the presence of resulting steps of discontinuities in the circumferential direction on the part of the inner surface of the clamping structure.

A further object of the present invention resides in a clamp structure utilizing a rivet-like connection of the free overlapping ends of the band material which prevents an outward displacement of the hose material into very small gaps or discontinuities that might be formed during contraction of a so-called "Oetiker" ear.

Still another object of the present invention resides in a clamp structure of the type described above which can be readily used with plastic hose materials of relatively high hardness, yet is easy and relatively inexpensive to manufacture and simple to install.

These and other objects, features and advantages of the present invention will become more apparent from the following description when taken in connection with the accompanying drawing which shows, for purposes of illustration only, several embodiments in accordance with the present invention and wherein:

FIG. 1 is an elevational view of a prior art clamp structure with a rivet-like connection of the overlapping ends of the band portions as disclosed in my U.S. Pat. No. 3,286,314;

FIG. 2 is a cross-sectional view taken along line II—II of FIG. 3, illustrating the prior art rivet-like connection in the assembled condition;

FIG. 3 is a perspective view of a prior art clamp structure with an outwardly extending shoulder-like step to minimize discontinuities in the inner clamping surface of the clamp structure;

FIG. 4a is a partial elevational view, on an enlarged scale, illustrating the area of overlap of the inner and outer band portions in an arrangement as shown in FIG. 3 prior to the contraction of a so-called "Oetiker" ear;

FIG. 4b is an elevational view, illustrating in an exaggerated manner, the possible leakage problem that may occur with the arrangement shown in FIGS. 3 and 4a when the "Oetiker" ear is contracted;

FIG. 5 is an elevational view of a clamp structure in accordance with the present invention;

FIG. 6 is a partial plan view, on an enlarged scale, on the unfolded overlapping ends of the inner and outer band portions in a clamp structure according to the present invention;

FIG. 7a is a cross-sectional view taken along line VII—VII of FIG. 6 and illustrating one embodiment of the configuration of a tongue portion in accordance with the present invention;

FIG. 7b is a cross-sectional view, also taken along line VII—VII of FIG. 6 and illustrating a modified embodiment of the configuration of the tongue portion in accordance with the present invention;

FIG. 7c is a cross-sectional view also taken along line VII—VII of FIG. 6 and illustrating a still further modified embodiment of the configuration of the tongue portion in accordance with the present invention;

FIG. 8 is a partial cross-sectional view taken along line VIII—VIII of FIG. 6;

FIG. 9 is a perspective view from the outside and from above and illustrating the mechanical interlock of a clamp structure in accordance with the present invention;

FIG. 10 is a perspective view, from the inside, and illustrating the mechanical interlock of a clamp structure in accordance with the present invention;

FIG. 11 is a cross-sectional view, similar to FIG. 8, with the parts in the assembled condition;

FIG. 12 is a perspective view of a clamp structure in accordance with the present invention provided with an insert member according to the present invention which assures a gap-free transition;

FIG. 13 is a partial cross-sectional view through the area of the ear and insert member of the clamp structure of FIG. 12, illustrating the parts in the assembled position thereof but before contraction of its so-called "Oetiker" ear; and FIG. 14 is a perspective view of a screw-type clamp with an insert member in accordance with the present invention.

Referring now to the drawing wherein like reference numerals are used throughout the various views to designate like parts, and more particularly to FIGS. 1 and 2, the clamp structure illustrated in these two figures corresponds essentially to the clamp structure as disclosed in my prior U.S. Pat. No. 3,286,314. The clamp structure generally designated by reference numeral 10 again includes an open-ended ring portion made of flat band material such as sheet metal or steel strip, whose overlapping inner and outer ends are designated by reference numerals 11a and 11b. The clamp structure 10 also includes a typical "Oetiker" ear generally designated by reference numeral 13 which consists of generally outwardly extending leg portions 14 and 15 interconnected by a bridging portion 16 that may be provided with a circumferentially extending reinforcing groove 17. The rivet-like mechanical interlock generally designated by reference numeral 20 for the free overlapping band ends 11a and 11b consists of a generally rectangular tab 21 punched out of the inner band material 11b which upon being bent-up at right angle, extends through a circumferentially extending slot 22 in the outer band portion 11a, whereby the tab 21 as shown in FIG. 2, is bent back in the direction of arrow 23 into position 21a to thereby displace inwardly the outer band material 24 disposed there-below (FIG. 2). Since the overlapping ends 11a and 11b would normally involve a step 26 (FIG. 1) corresponding to the thickness of the band material, it was already proposed in my prior U.S. Pat. No. 3,286,314 to provide a shoulder-like step or offset 27 (FIG. 3) which displaces the outer band portion 11a in the radially outer direction by a distance corresponding to about the thickness of the band material. The purpose thereof was to eliminate the step 26 of FIG. 1 and to improve thereby the inner surface as shown in FIG. 4a to minimize steps and/or discontinuities. Even though the arrangement of FIG. 4a may have involved a small gap that on occasion increased in length in the circumferential direction when the so-called "Oetiker" ear of the clamp was contracted, due to a very slight movement of the band portions 11a and 11b relative to one another, such gap was of practically no significance with the relatively more elastic hose materials which had been used in the past. However, with the recent availability of plastic hose materials with a relatively high degree of hardness, of the order of 90 Shore and greater, or with the use of very thin walled hard or soft hose materials, the small gaps that may have occurred from time to time in the arrangement of FIG. 3 can no longer be ignored, as illustrated in FIG. 4b, in which the possible leakage area 28 is schematically illustrated in an exaggerated manner. Hence, to assure a completely satisfactory operation of the clamp structure as shown in FIGS. 1 and 3, the problem of a gap-free transition, i.e., devoid of any discontinuities or steps in the circumferential internal object-engaging surface of the clamp structure assumed ever greater importance.

To avoid the aforementioned shortcomings of the prior art, the present invention, as illustrated in FIGS. 5 through 11, in which the same reference numerals are used for corresponding parts as in FIGS. 1 through 4b, utilizes a tongue portion 31 extending in the circumferential direction from the free end of the inner band portion 11b which is adapted to engage in a tongue-receiving means formed in the illustrated embodiment by a slot-like aperture 32 also extending in the circumferential direction and provided in the outer band portion 11a. If a shoulder-like step or offset 27 is provided in the outer band portion 11a, then the slot-like aperture 32 is preferably located at least within the area of the step 27; however, depending on the length of the tongue portion 31, the slot-like aperture 32 will extend a corresponding distance in the circumferential direction of the band 11 to accommodate the tongue portion in the assembled condition. The tongue portion 31 may be flat in cross section as shown in FIG. 7a but is preferably of convexly curved cross section as shown in FIG. 7b so that the areas of engagement of the tongue portion 31 with the hose material are more or less concentrated onto the inwardly projecting more or less point-like end portions 31' within the outer areas of the arcuate configuration to thereby increase the specific fastening forces acting on the hose material and thus to contribute to the holding ability of tongue portion 31 within the critical areas. In the alternative, the tongue portion 31 may also be concavely curved as shown in FIG. 7c which provides for a holding ability superior to that of FIG. 7a.

FIG. 9 illustrates the clamp structure according to the present invention before the tab 21 extending through the slot-like opening 22 is bent back upon itself, while FIGS. 10 and 11 illustrate the arrangement according to the present invention after the rivet-like mechanical interlock is completed.

As can be seen from FIG. 11 the tongue-like portion 31 extending through the slot-like aperture 32, assures a completely gap-free transition from the inner band portion 11b into the adjoining part of the clamping band 11, devoid of any steps, gaps, discontinuities or offsets that might cause a leakage problem, since the hose material is pressed against the object to which it is to be fastened, such as a nipple, over the entire circumferential extent of the mechanical interlock 20 including its overlapping band ends. This is realized by the presence of the tongue portion 31 which engages the hose within the area of the step or offset 27 to thereby assure complete tightness; the length of the tongue portion 31 is thereby so selected that it overlaps sufficiently the side portions 11c (FIG. 10) remaining in the band 11 on both sides of the slot-like aperture 32 when the "Oetiker" ear is contracted.

FIGS. 12 and 13 illustrate the present invention when used with an insert member generally designated by reference numeral 35 which is intended to bridge the gap underneath the typical "Oetiker" ear 13 when the latter is contracted. As can be seen in FIG. 12, the insert member 35 includes tongue portions 36 at the free ends thereof adapted to engage in tongue-receiving means formed in the illustrated embodiment by slot-like apertures 37 provided in the band material 11. If the band material 11 is again provided with step-like shoulder or offset portions 27 to shift the outer band portions 11a in the radially outer direction by a thickness corresponding to about the thickness of the insert member 35, then the slot-like apertures 37 are preferably located again at least within the area of the step-like shoulder or offset portions 27 and in the illustrated embodiment extend a distance in the circumferential direction within the band material 11 sufficient to accommodate the length of the tongue portions 36 when the "Oetiker" ear 13 is contracted. The tongue portions 36 may be flat in transverse cross section as indicated in FIG. 12, but are preferably also of convexly curved cross section as shown in FIG. 7b for reasons pointed out hereinabove.

As shown in FIG. 13, the arrangement of the present invention including the provision of the tongue portions 36 adapted to engage in apertures 37 assures a completely gap-free transition within the area of overlap of the insert member 35 and of the outer band portions 11a. Moreover, the band material for the insert member 35 no longer has to be chosen very thin but can be made substantially thicker than possible heretofore, for example, may be of the same thickness as the band material used in the clamp itself or even thicker. This will minimize the danger of collapse or buckling of the insert member 35 into the gap underneath the ear 13. Furthermore, to increase the engaging force within the area of the insert member 35 underneath the opening of the ear 13 during the closing of the latter, the insert member 35 may be provided with an outwardly extending embossment 39 which is engaged by the corners 14' and 15' representing the transitions between the leg portions 13 and 14, on the one hand, and the outer band portions 11a, on the other, when the corners 14' and 15' ride up on the embossment 39 during contraction of the ear 13. The embossment 39 is of particular advantage if the insert member 35 is made of relatively thinner band material since it will prevent in that case a buckling of the band material of the insert member 35 into the gap or opening underneath the ear 13. Furthermore, in lieu of one substantially centrally located embossment 39, also several side-by-side embossments may be provided in the same area. Moreover, when the ear 13 is contracted, the hose 29 disposed underneath the ear 13 is pressed down more strongly by the embossment 39 extending outwardly underneath the ear, whence a completely satisfactory seal is also assured underneath the ear 13.

While FIGS. 12 and 13 show an insert member provided with tongue portions in accordance with the present invention as used with a clamp structure having a rivet-like connection of the overlapping free ends in accordance with the present invention, it is understood that the insert member in accordance with the present invention may also be utilized with different types of clamp structures having so-called "Oetiker" ears, e.g., with a clamp made from endless ring-like stock or with a clamp in which the free ends are mechanically interconnected in some other manner, for example, by spot-welding, by inwardly or outwardly extending hooks or by any other mechanical interconnecting means. For example, the present invention may also be used with a prior art screw-type clamp generally designated by reference numeral 110 (FIG. 14) consists of a flat band portion 111 provided at the free ends thereof with generally radially outwardly extending leg portions 114 and 115 each provided with a bore 114' and 115' to receive therethrough a threaded screw or bolt member 118 adapted to tighten the clamp by being extended from one side of the clamp openings 115' and 114' and thereafter engaging with a nut 119. To bridge the opening between the two leg portions 114 and 115, an insert member 135 may be provided which again includes tongue-like portions 136 adapted to engage in slot-like apertures 137 provided again at least within the areas of shoulder-like steps or offsets 127. As the screw-type clamp structure of FIG. 14 is tightened by drawing together the leg portions 114 and 115 by means of the screw and nut 118 and 119, the tongue portions 136 will engage into the slot-like apertures 137 thereby again assuring a gap-free transition between the ends of the insert member 135 and the circular configuration of the hose clamp formed by the band 111. Additionally, a tongue-like extension adapted to engage in a slot-like aperture of the clamping band may also be used with the same advantages with a screw-type hose clamp having a worm drive.

Consequently, while I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A clamp structure which comprises band means, *connecting means in the end areas of the band means for connecting together the band means,* and at least one means for tightening the clamp structure about an object to be fastened, and in which at least one overlap exists between an outer band portion and the free end of an inner band material which may cause a discontinuity in the smooth, ring-like internal configuration of the clamp structure, characterized by further means including a tongue-like means at the free end of the inner band material and an outwardly directed step in the corresponding overlapping area of the outer band portion *and spaced from the end of the outer band portion a predetermined distance, said outer band portion being* provided with means *extending from the area of step away from the free end of the outer band portion* for receiving the tongue-like means to thereby assure a substantially smooth, gap-free transition devoid of any step in the circumferential direction from [each] *a respective* free end of the inner band [materials] *material* to the ring-like configuration formed by the adjoining band portion of the band means when the clamp structure is tightened about said object by the use of said tightening means, *the inner surface of the full width outer band portion in the vicinity of the step constraining the corresponding portion of the tongue-like means against any substantial radial outward movement when the clamp structure is tightened.*

2. A clamp structure according to claim 1, characterized in that said further means includes tongue-like means at each free end of the [overlapping] *overlapped inner* band material and tongue-receiving means in a corresponding outwardly stepped area of each outer band portion, into which a respective tongue means is operable to engage during contraction of the [ear] *tightening* means.

3. A clamp structure according to claim 1 or 2, characterized in that the free end of the inner [overlapping] *overlapped* band material is formed by an overlapping inner band portion of the band means itself.

4. A clamp structure according to claim 1 or 2, characterized in that the free end of the inner [overlapping] *overlapped* band material is formed by an insert means having a tongue-like means at each free end thereof.

5. A clamp structure according to claim 3, characterized in that the means for tightening the clamp structure includes two outwardly extending leg portions operable to be drawn together.

6. A clamp structure according to claim 4, characterized in that the means for tightening the clamp structure includes two outwardly extending leg portions operable to be drawn together.

7. A clamp structure which comprises a ring-like band means made from band material [whose] *with means for connecting together* overlapping free ends [are connected together] and which includes in its circumference at least one plastically deformable ear means adapted to be contracted to tighten the clamp structure about an object to be fastened, characterized in that further means are provided near the overlapping end portions of the band means to assure a substantially gap-free transition in the circumferential direction from the free end of the inner band portion to the ring-like configuration of the adjoining outer band portion when the clamp structure is tightened by deformation of the ear means, said further means including a tongue-like portion at the free end of the inner band portion and an outwardly directed step-like portion provided with means for receiving the tongue-like portion within the area of overlap, *said step being formed in the outer band portion a distance from the free end thereof to enable the inner band portion to slide with its full band width up to the area of the step during tightening of the clamp structure, and said tongue-receiving means beginning at said step-like portion and extending away from the area of overlap of the inner and outer band portions.*

8. A clamp structure according to claim 2, characterized in that the band means is made from substantially flat strip material.

9. A clamp structure according to claim 7, characterized in that the band material is flat steel band material.

[10. A clamp structure according to claim 7, characterized in that the further means includes tongue means at the free end of the inner band portion which is operable to engage into an aperture forming part of the tongue-receiving means provided in a corresponding location of the outer band portion.]

11. A clamp structure according to claim [10,] *36,* characterized in that said last-mentioned aperture is provided at least within the area of said step-like portion.

12. A clamp structure according to claim 11, characterized in that said step-like portion displaces the outer band portion relative to the ring-like configuration of the clamp structure which is defined within the area of overlap by the inner band portion, by a radial distance at least approximately equal to the thickness of the band material.

13. A clamp structure according to claim 11, characterized in that the overlapping free ends are mechanically interlocked by rivet-like means.

14. A clamp structure according to claim 13, characterized in that the rivet-like means is formed by a circumferentially extending tab formed out of the inner band portion and extending through a circumferentially extending slot in the outer band portion, and in that the tab, upon being bent back into the band material, displaces inwardly the band material of the outer band portion disposed therebelow.

15. A clamp structure according to claim 7, 8, 9, 10, 11, 12, 13 or 14, characterized in that the ear means includes two generally outwardly extending leg portions interconnected by a generally circumferentially extending bridging portion.

16. A clamp structure according to claim 15, characterized by a groove-like reinforcing means extending generally in the circumferential direction in said bridging portion.

17. A clamp structure according to claim 15, characterized in that an insert means of flat band material is provided in said clamp structure at least within the area underneath the opening of the ear means and of the band portions adjoining the ear means, and in that still further means are provided at the free ends of said insert means and in the corresponding areas of the band portions to assure a substantially gap-free transition in the circumferential direction from the free ends of the insert means to the ring-like configuration of the clamp structure which is formed by the adjoining band portions of the band means, said still further means including a tongue-like portion at each free end of said insert means and an outwardly directed, tongue-receiving step-like portion in each corresponding overlapping area of said band portions.

18. A clamp structure according to claim 17, characterized in that each tongue-receiving portion is formed at least in part by an aperture means in corresponding areas of said last-mentioned adjoining band portions, into which a respective tongue-like portion is operable to engage during contraction of the ear means.

19. A clamp structure according to claim 18, characterized in that each last-mentioned aperture means is located at least within the area of a corresponding outwardly extending step-like portion.

20. A clamp structure according to claim 19, characterized in that each tongue like portion is relatively flat in transverse cross section.

21. A clamp structure according to claim 19, characterized in that each tongue like portion is generally convexly curved in transverse cross section to concentrate the engaging forces thereof exerted on the object to be fastened to the outer end areas of the arcuately curved tongue means.

22. A clamp structure according to claim 10, characterized in that each tongue like portion is relatively flat in cross section.

23. A clamp structure according to claim 10, characterized in that the tongue like portion is generally convexly curved in cross section to concentrate the areas of engagement thereof with the object to be fastened to the outer end areas of the arcuately curved tongue means.

24. A clamp structure which comprises a band means, at least one means for tightening the clamp structure about the object to be fastened, and an insert means in said clamp structure at least within the area of an opening underneath the tightening means of the adjoining band portions of the band means, characterized by further means at the free ends of the insert means and in the corresponding areas of the band portions to assure a substantially gap-free, stepless transition in the circumferential direction from the free ends of said insert means to the ring-like configuration formed by the adjoining band portions of the band means, said further means including tongue-like means at each free end of the insert means and tongue-receiving means within outwardly *displaced* step-like portions in said adjoining band portions.

25. A clamp structure according to claim 24, characterized in that said tongue-receiving means includes aperture means in corresponding areas of the adjoining band portions, into which a respective tongue-like means is operable to engage during contraction of the ear means.

26. A clamp structure according to claim 25, characterized in that each last-mentioned aperture means is located at least within the area of an outwardly extending step-like portion provided in the corresponding band portion of the band means *and extends away from the tightening means.*

27. A clamp structure according to claim 26, characterized in that said step-like portion displaces the outer band portion relative to the ring-like configuration of the clamp structure, by a radial distance at least approximately equal to the thickness of the band material of the band means.

28. A clamp structure according to claim 24 or 26, characterized in that each tongue like means is relatively flat in transverse cross section.

29. A clamp structure according to claim 24 or 26, characterized in that each tongue like means is generally convexly curved in transverse cross section to concentrate the areas of engagement thereof with the object to be fastened to the outer end areas of the arcuately curved tongue means.

30. A clamp structure according to claim 24 or 26 characterized in that each tongue like means is generally concavely curved in transverse cross section.

31. A clamp structure according to claim 24 or 25, characterized in that the ear means includes two generally outwardly extending leg portions interconnected by a generally circumferentially extending bridging portion.

32. A clamp structure according to claim 30, characterized by a groove-like reinforcing means in said bridging portion which extends generally in the circumferential direction.

33. A clamp structure according to claim 1 or 2, characterized in that the means for tightening the clamp structure includes two outwardly extending leg portions operable to be drawn together.

34. A clamp structure according to claim 33, characterized in that the two leg portions form part of a plastically deformable ear means.

35. A clamp structure according to claim 33, characterized in that the two leg portions which form part of a screw-type clamp are operable to be drawn together by threaded means.

*36. A clamp structure which comprises a ring-like band means made from band material with means for connecting together overlapping free ends and which includes in its circumference at least one plastically deformable ear means adapted to be contracted to tighten the clamp structure about an object to be fastened, characterized in that further means are provided near the overlapping end portions of the band means to assure a substantially gap-free transition in the circumferential direction from the free end of the inner band portion to the ring-like configuration of the adjoining outer band portion when the clamp structure is tightened by deformation of the ear means, said further means including a tongue-like portion at the free end of the inner band portion and an outwardly directed step-like portion provided with means for receiving the tongue-like portion within the area of overlap, said tongue-receiving means beginning at said step-like portion and extending away from the area of overlap of the inner and outer band portions, and said tongue means at the free end of the inner band portion being operable to engage into an aperture forming part of the tongue-receiving means provided in a corresponding location of the outer band portion.*

* * * * *